US012345579B2

(12) United States Patent
Michiwaki

(10) Patent No.: US 12,345,579 B2
(45) Date of Patent: Jul. 1, 2025

(54) STRESS MONITORING DEVICE, STRESS MONITORING SYSTEM, AND MONITORING SYSTEM

(71) Applicant: NEXT INNOVATION INC., Tokyo (JP)

(72) Inventor: Hiroshi Michiwaki, Tokyo (JP)

(73) Assignee: NEXT INNOVATION INC., Tokyo (JP)

( * ) Notice: Subject to any disclaimer, the term of this patent is extended or adjusted under 35 U.S.C. 154(b) by 590 days.

(21) Appl. No.: 17/626,784

(22) PCT Filed: Jul. 8, 2020

(86) PCT No.: PCT/JP2020/026756
§ 371 (c)(1),
(2) Date: Jan. 12, 2022

(87) PCT Pub. No.: WO2021/010263
PCT Pub. Date: Jan. 21, 2021

(65) Prior Publication Data
US 2022/0252473 A1 Aug. 11, 2022

(30) Foreign Application Priority Data
Jul. 12, 2019 (JP) .................................. 2019-130717

(51) Int. Cl.
*G01L 1/22* (2006.01)
*G06N 3/08* (2023.01)

(52) U.S. Cl.
CPC . *G01L 1/22* (2013.01); *G06N 3/08* (2013.01)

(58) Field of Classification Search
CPC ... G01L 1/22; G01L 5/24; G01L 1/146; G01L 5/0028; G06N 3/08; G01M 99/007
See application file for complete search history.

(56) References Cited

U.S. PATENT DOCUMENTS 10,900,844 B2  1/2021  Irie et al.
2007/0074587 A1  4/2007  Mol et al.
(Continued)

FOREIGN PATENT DOCUMENTS

JP  2006-528347 A  12/2006
JP  2010-196306 A   9/2010
(Continued)

OTHER PUBLICATIONS

Japanese Notice of Reasons for Refusal for Japanese Application No. 2021-102797, dated May 27, 2022, 10 pages with English translation.
(Continued)

*Primary Examiner* — Manuel A Rivera Vargas
(74) *Attorney, Agent, or Firm* — TraskBritt

(57) ABSTRACT

A stress monitoring device includes an information acquisition unit that acquires measured information concerning deformation or strain applied to a structural member constituting a structure; and a storage unit that stores associated stress information configured by associating the measured information with disposition information of the structural member, the disposition information including design information of the structure, as well as disposed-position information of the structural member, the disposed-position information being associated with the design information. The associated stress information can be output to a terminal.

12 Claims, 10 Drawing Sheets

(56) References Cited

U.S. PATENT DOCUMENTS

| | | | |
|---|---|---|---|
| 2018/0231047 A1 | 8/2018 | Tran et al. | |
| 2019/0390651 A1* | 12/2019 | Nohara | F03D 7/04 |
| 2020/0264056 A1* | 8/2020 | Okulov | G01L 1/04 |
| 2021/0318191 A1* | 10/2021 | Okulov | G06F 1/1656 |
| 2022/0221355 A1* | 7/2022 | Fowler | B64F 5/60 |

FOREIGN PATENT DOCUMENTS

| | | |
|---|---|---|
| JP | 2017-142198 A | 8/2017 |
| JP | 2018-153901 A | 10/2018 |
| JP | 6440892 B1 | 12/2018 |
| JP | 2019-048309 A | 3/2019 |
| JP | 2019-048390 A | 3/2019 |
| WO | 2017/124294 A1 | 7/2017 |

OTHER PUBLICATIONS

International Search Report for International Application No. PCT/JP2020/026756, mailed Aug. 11, 2020, 5 pages with English Translation.

International Written Opinion for International Application No. PCT/JP2020/026756, mailed Aug. 11, 2020, 7 pages with English Machine Translation.

* cited by examiner

|  | Sensor ID | Disposed-position | Disposed-attitude | Stress(N/mm²) | Structure ID | ... |
|---|---|---|---|---|---|---|
| Bolt-shaped sensor 40a | 001 | ... | ... | 577 | A1 | ... |
| Bolt-shaped sensor 40b | 002 | ... | ... | 194 | A1 | ... |
| Bolt-shaped sensor 40c | 003 | ... | ... | 638 | A1 | ... |
| Bolt-shaped sensor 40d | 004 | ... | ... | 671 | A1 | ... |

FIG.7

STRESS MONITORING DEVICE, STRESS MONITORING SYSTEM, AND MONITORING SYSTEM

CROSS-REFERENCE TO RELATED APPLICATIONS

This application is a national phase entry under 35 U.S.C. § 371 of International Patent Application PCT/JP2020/026756, filed Jul. 8, 2020, designating the United States of America and published as International Patent Publication WO 2021/010263 A1 on Jan. 21, 2021, which claims the benefit under Article 8 of the Patent Cooperation Treaty to Japanese Patent Application Serial No. 2019-130717, filed Jul. 12, 2019.

TECHNICAL FIELD

The following description relates to a stress monitoring device and the like for acquiring information on stress distribution applied to a structure.

BACKGROUND

In a related art, methods for measuring stress distribution generated in a construction such as a bridge or a highway are known, and as one of the methods, there is, for example, an infrared thermography method using an infrared camera. The infrared thermography method measures minute temperature fluctuations, i.e., thermoelastic temperature fluctuations, that occur in an object when the object is elastically deformed by the infrared camera (an infrared sensor), and detects defects of the object based the measurement. As another method, a method for measuring stress distribution occurring in a bridge is known, which includes taking an image of a space between piers with an infrared camera, calculating an amount of temperature change based on thermal image data taken when a vehicle passes, and calculating an amount of stress change based on the amount of temperature change (for example, see patent document 1).

RELATED ART DOCUMENT

Patent Document

Patent Document 1: International Publication No. WO 2017/141294

BRIEF SUMMARY

Technical Goals

According to the infrared thermography method, it is possible to measure the stress distribution on a surface of the construction in a range photographed by the infrared camera, but it is required to arrange a plurality of infrared cameras in order to figure out the stress distribution in the entire construction. In particular, in the case that the construction is large, it is required to arrange a large number of infrared cameras around the construction. Further, in the case that the construction is outdoors, it is difficult to figure out exact stress distribution due to a temperature difference between a sunny area and a shaded area. In addition, depending on the climate, such as exposure to wind and rain, the temperature may be forcibly lowered, so it is difficult to figure out the exact stress distribution. Therefore, there is an issue in that it is not accurate to figure out the stress distribution from the temperature change depending on the location of a measurement target, and consequently the occurrence of serious abnormalities such as cracks is overlooked or the degree of fatigue or the endurance limit cannot be determined.

An aspect provides a means for acquiring stress information with high accuracy of all or part of a structure.

Technical Solutions

According to an aspect, there is provided a stress monitoring device including an information acquisition unit configured to acquire measured information concerning deformation or strain applied to a structural member constituting a structure, and a memory configured to store associated stress information configured by associating the measured information with design information of the structure and disposition information of the structural member including disposed-position information of the structural member associated with the design information. The stress monitoring device is operable to output the associated stress information. Further, the design information of the structure and/or the disposition information of the structural member may be acquired in advance. In addition, the disposition information of the structural member may include disposed-attitude information of the structural member with respect to the structure. Furthermore, the structural member may be a joining member joined to and between two or more structural members.

Further, the stress monitoring device according to the aspect may include a calculation unit configured to calculate stress distribution information on stress distribution acting on all or part of the structure from the associated stress information. The stress monitoring device may be operable to output the stress distribution information by the calculation unit in place of or together with the associated stress information.

Further, the stress monitoring device according to the aspect may include a trainer configured to generate a machine learning model for calculating the stress distribution information from the associated stress information by the calculation unit and manage parameters of the machine learning model, an analyzer configured to analyze the associated stress information to acquire analyzed stress distribution information of the stress distribution of the structure, and a determination unit configured to compare the stress distribution information by the machine learning model and the analyzed stress distribution information by the analyzer and determine a degree of agreement. The trainer may be configured to perform machine learning using the analyzed stress distribution information as training data so as to improve the degree of agreement by the determination unit and update the parameters.

Further, the stress monitoring device according to the aspect may be operable to output the stress distribution information in the case that the degree of agreement by the determination unit is equal to or greater than a threshold.

Further, the trainer of the stress monitoring device according to the aspect may generate a deep learning model.

Further, the analyzer of the stress monitoring device according to the aspect may be configured to perform an inverse analysis using the associated stress information to specify an analysis condition, perform a forward analysis by a finite element method using the analysis condition and the design data of the structure, and acquire the analyzed stress distribution information based on a result of the forward analysis.

Moreover, in the stress monitoring device according to the aspect, the analysis condition may include a load condition.

Further, the information acquisition unit of the stress monitoring device according to the aspect may be configured to acquire the measured information by a strain sensor provided on the structural member.

Further, the information acquisition unit of the stress monitoring device according to the aspect may be configured to acquire the measured information by a strain sensor provided in a joining member arranged at a position where members constituting the structure are joined to each other.

Moreover, in the stress monitoring device according to the present aspect, the strain sensor may be disposed over and between two members to be joined fixed to each other.

Moreover, in the stress monitoring device according to the present aspect, the strain sensor may form the joining member.

Moreover, in the stress monitoring device according to the aspect, the strain sensor may be integrally formed with the structural member.

Further, in the stress monitoring device according to the aspect, the joining member may be in the form of any one of a male-threaded joining member, a female-threaded joining member, a washer-shaped joining member, a socket-shaped joining member, a tubular joining member, a plate-shaped joining member, an L-shaped joining member, and a T-shaped joining member.

Further, in the stress monitoring device according to the aspect, the structure may be configured by joining two or more members.

According to another aspect, there is provided a stress monitoring system including a stress monitoring device, and a strain sensor disposed on a joining member and connected to the stress monitoring device. The stress monitoring system is operable to output various types of information from the stress monitoring device to an external terminal.

According to another aspect, there is provided a monitoring system including an information acquisition unit configured to acquire measured information according to a target, an inverse analyzer configured to estimate a cause factor and its level by performing an inverse analysis on the measured information, a forward analyzer configured to perform a forward analysis using the cause factor and its level estimated by the inverse analyzer, and acquire a state according to the factor and its level of the target by the result of the forward analysis, a calculation unit configured to calculate a virtual state of the target by using the measured information, a trainer configured to generate a machine learning model for calculating the virtual state by the calculation unit and manage parameters of the machine learning model, and a determination unit configured to compare the state acquired by the forward analyzer and the virtual state and determine a degree of agreement. The trainer is configured to perform machine learning using the state of the target as training data so as to improve the degree of agreement by the determination unit, and update the parameters.

Effects

According to example embodiments, it is possible to acquire stress information with high accuracy from measured information of a strain sensor.

BRIEF DESCRIPTION OF THE DRAWINGS

FIG. 7 is a diagram illustrating a part of data constituting associated stress information.

DETAILED DESCRIPTION

Figure 1:
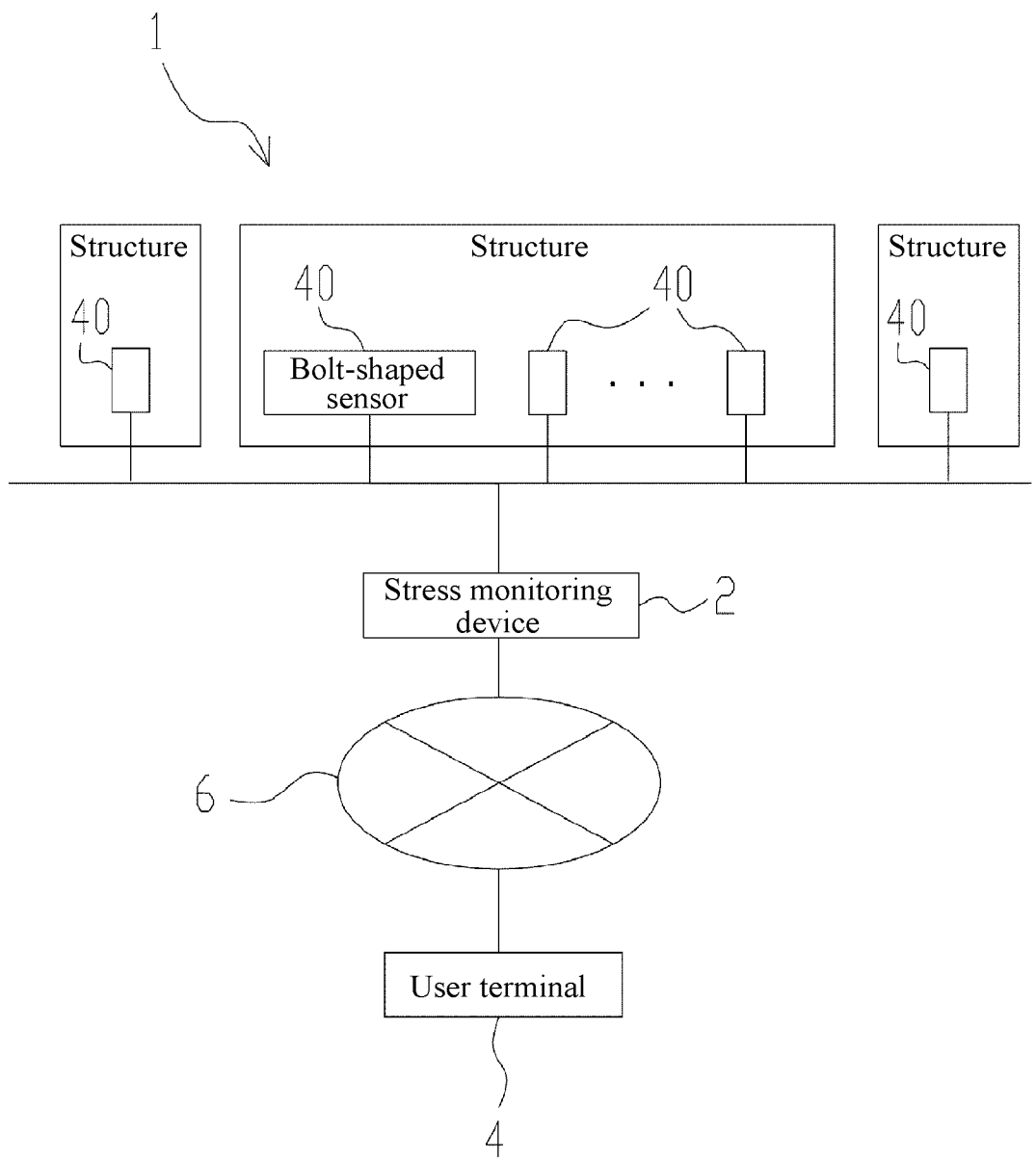
FIG. 1 is a block diagram illustrating a stress monitoring system according to an example embodiment.

Example embodiments of a stress monitoring system will be described below with reference to the drawings. FIG. 1 is a block diagram illustrating a stress monitoring system according to an example embodiment. A stress monitoring system 1 is configured by connecting a stress monitoring device 2 and a user terminal 4 via a network 6. A plurality of bolt-shaped sensors 40 (junction member type sensors) are communicatively connected to the stress monitoring device 2 via a dedicated line or the like.

The bolt-shaped sensor 40 has a bolt shape related to a structural member used in a structure constituted by joining two or more members such as a construction (including a building and an erection), a vehicle (means of transportation), home appliances, an agricultural machine, a construction machine (including a general construction machine and a special construction machine), and a machine tool. Further, the bolt-shaped sensor 40 may detect stress caused by a load. In other words, the bolt-shaped sensor 40 functions as a bolt (junction member)-type sensor, which is joined to and between two or more structural members of the structure.

The load here includes a single load, a repetitive load, an alternating load, and an impact load. Of course, the load includes a traffic load, a collision load, an earthquake load, a wind load, a thermal load, a snow load, a water load, and a load due to water pressure, water flow, or buoyancy.

Figure 2:
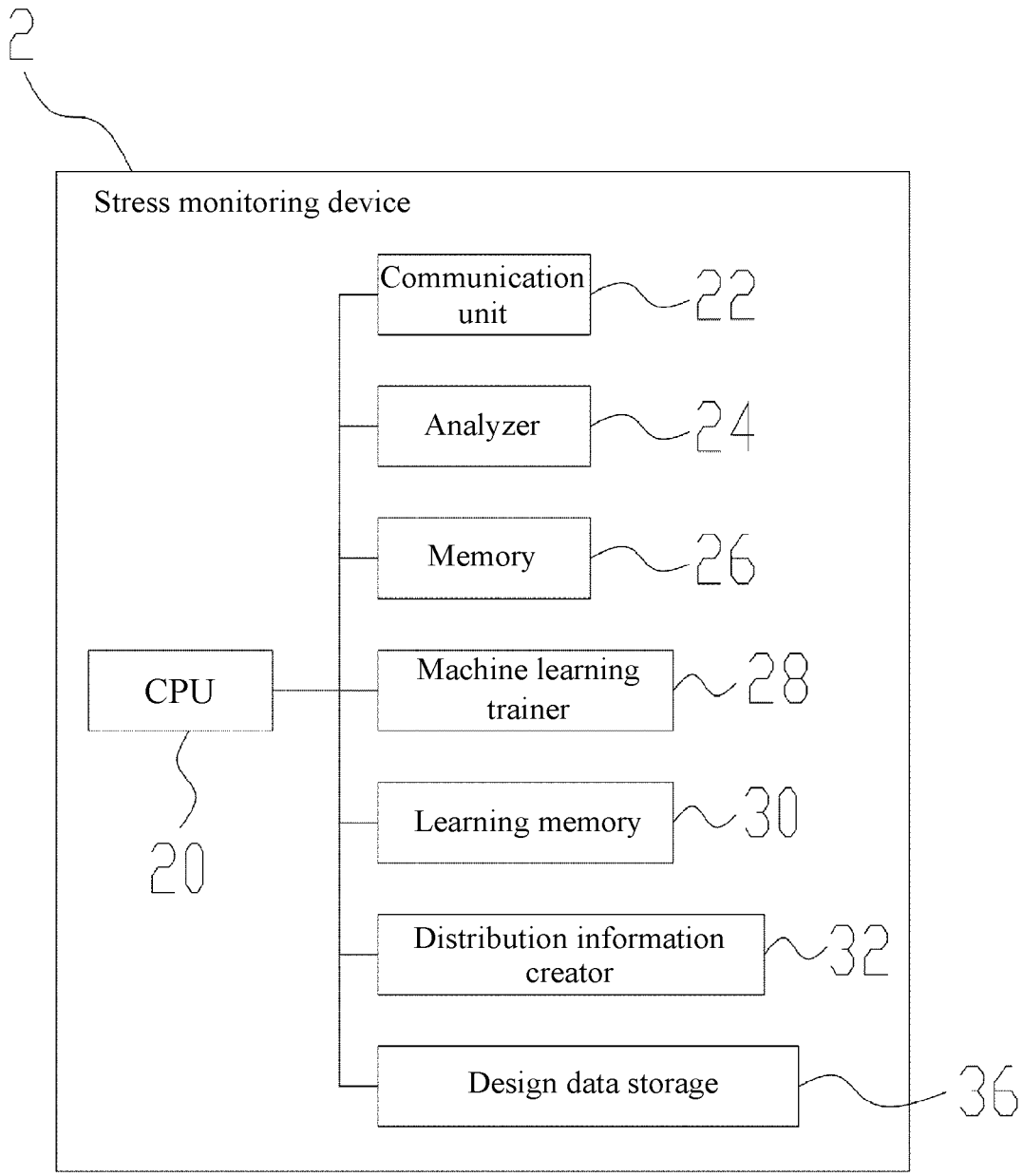
FIG. 2 is a block diagram illustrating a stress monitoring device.

FIG. 2 is a block diagram illustrating the stress monitoring device 2. The stress monitoring device 2 includes a CPU 20, and a communication unit 22, an analyzer 24, a memory 26, a machine learning trainer 28, a learning memory 30, a distribution information creator 32, and a design data storage are connected to the CPU 20.

The communication unit 22 performs communication processing such as transmission of associated stress information (to be described later) or virtual stress distribution information (to be described later) to the user terminal 4, and reception of measured information from the bolt-shaped sensor 40. The analyzer 24 performs an analysis for specifying a load condition based on stress information acting on the plurality of bolt-shaped sensors 40 for each structure (an inverse analysis), or a forward analysis for creating analyzed stress distribution information for the entire structure based on the load condition and the like by a finite element method (an FEM analysis).

The analyzed stress distribution information obtained by the forward analysis of the analyzer 24 includes information such as stress distribution applied to the entire structure and shape changes due to strain or bending of the structure.

The memory 26 stores training data including information indicating a state of stress distribution applied to all or part of the structure when the load acts on the structure. Here, the stress distribution is determined by load conditions such as the position, direction, orientation, and size of the load acting on the structure. Therefore, in the example embodiment, the analyzed stress distribution information obtained by the analyzer 24 is treated as the training data, and the memory 26 stores the analyzed stress distribution information corresponding to various load conditions for each structure as the training data.

The machine learning trainer 28 performs machine learning and generates a neural network model (machine learning model) for creating stress distribution of the structure from the stress information of the bolt-shaped sensor 40. Further, during the learning stage of the neural network model, the machine learning trainer 28 performs an operation for learning a weight parameter from the training data accumulated in the memory 26. In addition, the machine learning model is not limited to the neural network model, and may be a logistic regression model or a deep learning model.

The learning memory 30 stores information according to the machine learning model, such as the neural network model and the weight parameter different for each structure in which the bolt-shaped sensor 40 is used. The distribution information creator 32 creates the virtual stress distribution information indicating the stress distribution of the entire structure from a calculation result when the stress information of the bolt-shaped sensor 40 is input into the neural network model.

Further, the stress information is associated with dimensional information or shape information, material information, and the like of the bolt-shaped sensor 40 in addition to a stress value itself, and includes an amount of deformation or strain from which the stress value can be calculated. In addition, the stress information may include an electrical resistance value, a voltage value, or a current value, which can be converted into the amount of deformation or strain or the stress value.

The design data storage 36 is a database, which manages as design data by associating member information of the members constituting the structure, structure information (for example, CAD data, design information), and bolt information of the bolt-shaped sensor 40 used in the structure, and the like, with a structure ID, which is an identifier of the structure.

Here, the member information may include information such as physical properties of each of parts of the structure (for example, in the case that the structure is a building, a roof, an outer wall, a floor, a wall, a ceiling, an interior window, etc.) specified by the material of the part, the shape of each part, and a method of joining (connecting) the parts.

Further, the bolt information includes disposition information of the bolt, material information of the bolt, shape information, and dimension information associated with a sensor ID indexed for each bolt-shaped sensor 40. The disposition information is information indicating a disposed-position, a disposed-attitude, and the like of the bolt-shaped sensor 40. In other words, the disposition information includes information indicating at which position and in what attitude (for example, an attitude in which the axial direction is horizontal (or vertical) and faces the south) each bolt-shaped sensor 40 is disposed in the structure.

The user terminal 4 is an information processing terminal, which displays an image according to the stress acting on the structure having the bolt-shaped sensor 40. The user terminal 4 may receive various types of information from the stress monitoring device 2 via the network 6, and the type is not limited.

The user terminal 4 is, for example, a smart phone, a mobile phone (feature phone), a personal digital assistant (PDA), a wearable terminal (head mounted display, glasses type device, etc.), a tablet terminal, a notebook PC, a desktop PC, other various computers, or a monitor having arithmetic circuits.

The network 6 may be either a wireless network or a wired network. Specifically, the network 6 may be wireless LAN, wide area network (WAN), ISDNs (Integrated Service Digital Networks), LTE (Long Term Evolution), LTE-Advanced, CDMA (Code Division Multiple Access), 5th generation mobile communication system (5G), or LPWA (LAW Power Wide Area). Of course, the network may use Wi-Fi, a public switched telephone network, Bluetooth, an optical line, an ADSL (Asymmetric Digital Subscriber Line) line, a satellite communication network, or a combination thereof.

Figure 3:
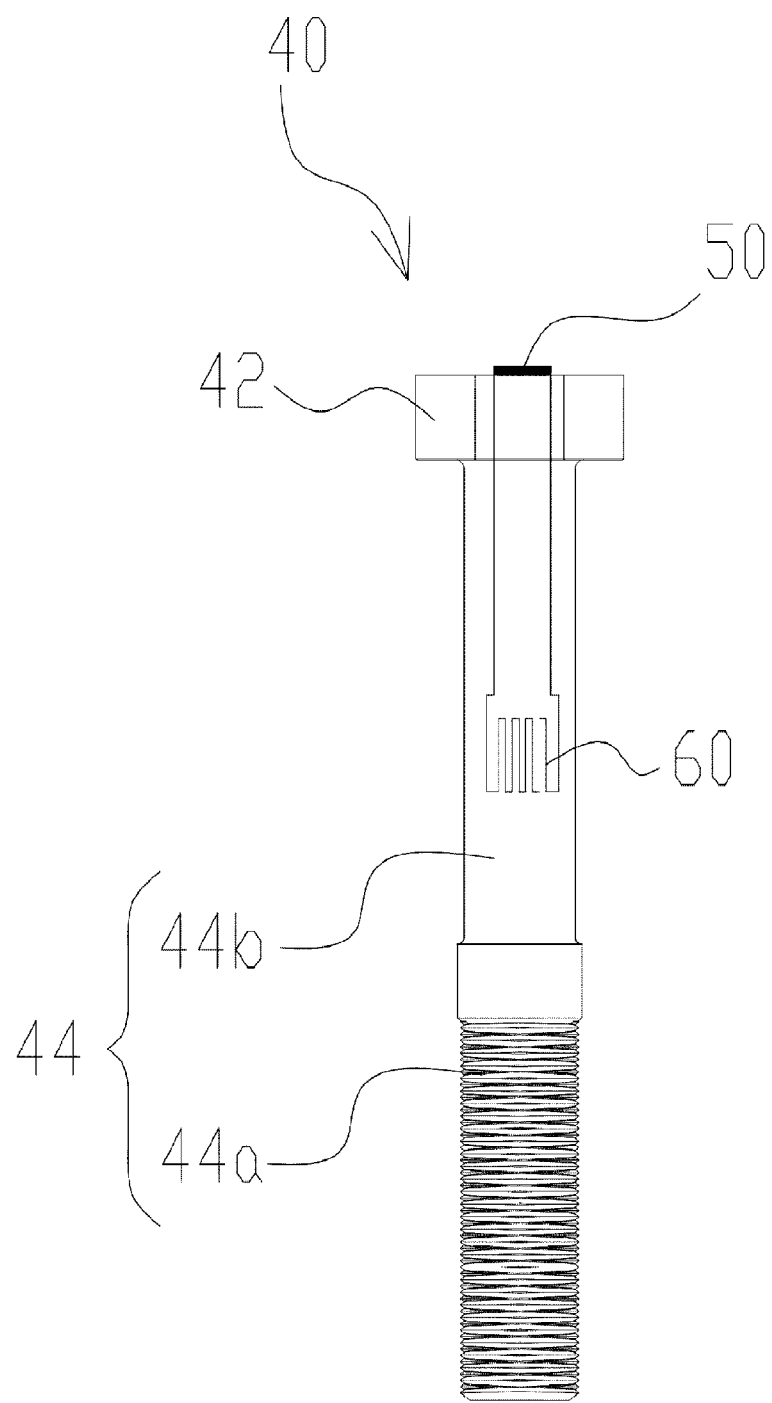
FIG. 3 is a diagram illustrating a bolt-shaped sensor.

FIG. 3 is a diagram illustrating the bolt-shaped sensor 40. The bolt-shaped sensor 40 shown in the example embodiment has a head 42 and a shaft 44 (Of course, the head is not necessarily required.). The head 42 is provided at one end of the shaft 44 and has an outer shape having a larger outer diameter compared to the shaft 44. The shaft 44 has a thread 44a having a male thread groove formed on the tip side, and a column 44b, which is a non-threaded portion located between the head 42 and the thread 44a (Of course, the column 44b is not necessarily required.).

A circuit board 50 is disposed on the top surface of the head 42, and a strain measurement sensor 60 (described later) formed on the surface of the shaft 44 is connected to the circuit board 50. The head 42 may be provided with a cover (not shown), which covers at least the circuit board 50 on the top surface.

The thread 44a of the shaft 44 has a first male screw spiral structure in which a spiral groove is formed in a predetermined lead angle and/or lead direction, and a second male screw spiral structure in which a spiral groove is set in a lead and/or lead direction different from the lead angle and/or lead direction of the first male screw spiral structure in an overlapping manner.

Here, two types of male screw spiral structures, the first male screw spiral structure serving as a right-handed screw that can be screwed into a female-threaded helix that is a corresponding right-handed screw and the second male screw spiral structure serving as a left-handed screw that can be screwed into a female-threaded helix that is a corresponding left-handed screw, are formed overlapping on the same region in the axial direction of the bolt-shaped sensor 40. Of course, the first male screw spiral structure and the second male screw spiral structure may be set so that the lead directions of right-hand threads are the same as each other and the lead angles are different from each other. It should be noted that the spiral grooves do not necessarily have to be formed in the overlapping manner, but it is preferable to have a mechanism capable of suppressing loosening as a joining member in order to perform precise and highly accurate strain measurement and stress measurement.

In the example embodiment, the thread 44a can be screwed with any female threaded body of either a right-hand thread or a left-hand thread. For details of the thread 44a in which the two types of male screw spiral grooves are formed, refer to Japanese Patent No. 4663813.

A conduction path serving as a strain measurement pattern is directly formed on the outer peripheral surface of the column 44b, and the strain measurement sensor 60 is directly installed on the column 44b. Further, the column 44b has an outer diameter equal to or less than a root diameter or an effective diameter of the thread 44a.

As a method of directly forming the strain measurement sensor 60 on the outer peripheral surface of the column 44b, for example, an electrically insulating layer is directly formed on the outer peripheral surface by lamination printing, putt printing, painting, plating, inkjet printing, and the like, and the strain measurement sensor 60 is directly formed on the layer. The method for forming the electrically insulating layer is not limited to each of the above methods. For example, various methods can be adopted such as forming a film by sputtering an insulating material in a state where a predetermined mask is arranged, applying and heating a silica material, or coating a silicone-based, polyimide-based, epoxy-based, or urethane-based organic insulating material.

In addition, the strain measurement sensor 60 is directly formed on the electrically insulating layer by lamination printing, putt printing, painting, plating, inkjet printing, sputtering, or the like, using a conductive paste. A pair of electrical contacts are formed at both ends of the strain measurement sensor 60 and connected to the circuit board 50, so that a voltage can be applied between the electrical contacts.

As a result, it is possible to detect the strain generated in the column 44b and the deformation of the column 44b by a change of a resistance value of the strain measurement sensor 60 in which the voltage is applied to the electric contact pair. If the shaft 44 (column 44b) is made of a non-conductor material, the strain measurement sensor 60 may be formed directly on the outer peripheral surface of the column 44b. Further, a coating layer having excellent abrasion resistance, scratch resistance, heat resistance, moisture barrier, solvent resistance, gas barrier, and deformation resistance (adhesion) may be formed to cover the strain measurement sensor 60.

Figure 4:
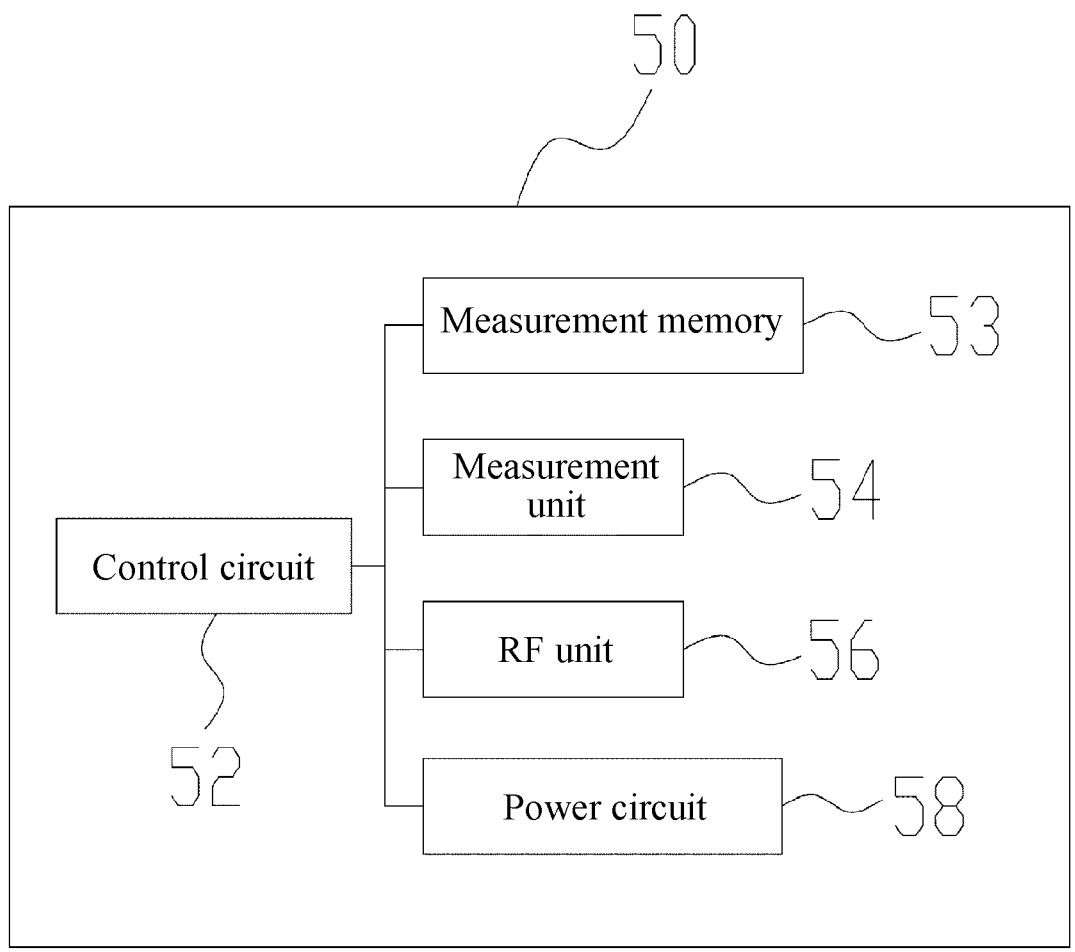
FIG. 4 is a block diagram illustrating a structure of a circuit board.

FIG. 4 is a block diagram showing a configuration of the circuit board 50. A control circuit 52 for collectively controlling each unit is arranged on the circuit board 50, and a measurement memory 53, a measurement unit 54, a radio frequency (RF) unit 56, and a power circuit 58 are connected to the control circuit 52. The measurement memory 53 may store the sensor ID and Young's modulus of the shaft 44, and may store the measured information based on the measurement result by the measurement unit 54.

The measurement unit 54 includes a measuring means for measuring stress information due to the change in electrical resistance detected via the strain measurement sensor 60. In addition, the measurement unit 54 may further include a temperature measuring means, a magnetic measuring means, an acceleration measuring means, or a gyro sensing means capable of measuring an angular acceleration based on the Coriolis' law. Therefore, the measurement unit 54 may output measured information including stress information and measurement results by other measuring means.

The RF unit 56 transmits the measured information output by the measurement unit 54 to the stress monitoring device 2 through an antenna (not shown).

The power circuit 58 uses a battery or the like (not shown) as a power source, converts the voltage into a voltage for driving each unit such as the control circuit 52, and supplies electric power. The battery may be, for example, a lithium battery that can be mounted on the circuit board 50, or a small all-solid-state battery, but a secondary battery may also be used. In the case that the secondary battery is used as the battery, a power receiving means (not shown) may be connected to the power circuit 58 to supply the power converted by the power receiving means to the battery.

The power receiving means converts vibration, temperature difference, external light (illuminated light or natural light), pressure change (air pressure change), external force change (wind, buoyancy change, rainfall), electromagnetic waves, and the like, into electric power. In other words, the power receiving means may include, for example, a coil, an antenna, a light receiving part (such as a photonic element system member or a solar panel), an energy conversion element such as an oscillator configured to be able to convert vibration or pressure change into electric energy, such as a microphone or a piezoelectric element, or a Seebeck element or circuit utilizing the Seebeck effect. Needless to say, the battery may be used as a commercial power source and connected to the power circuit 58 by wire via an external power supply device (AC adapter).

In addition, it is preferable that the control circuit 52 controls each unit to operate at all times, but in the case that the secondary battery is used for the battery, operation timing of each unit, such as measurement by the measurement unit 54 and transmission by the RF unit 56 may be adjusted in order to reduce power consumption.

The operation timing may be appropriately set, for example, based on time or the amount of charge. Moreover, it is not necessary to operate each unit at the same time, and the RF unit 56 may be controlled to operate less frequently than the measurement unit 54. For example, the measurement unit 54 may be operated at a predetermined measurement interval (for example, every hour), and the RF unit 56 may be controlled to operate at a predetermined transmission interval (for example, every day).

Further, the RF unit 56 may be controlled so that the RF unit 56 operates every time the measurement unit 54 performs measurement a predetermined number of times (for example, 5 times). In the case that the intervals of the operation of the measurement unit 54 and the operation of the RF unit 56 are different as described above, the control circuit 52 associates the measured information by the measurement unit 54 with measurement time obtained by a time check function (not shown) and stores the associated information in the measurement memory 53. Then, when the RF unit 56 operates, the measured information is collectively read from the measurement memory 53 and transmitted to the stress monitoring device 2.

In addition, the operation timing may be set so that the acceleration measuring means or the gyro sensing means of the measurement unit 54 always operates and the stress information is measured when the acceleration measuring means or the gyro sensing means detects a large change greater than or equal to a predetermined value.

Figure 5:
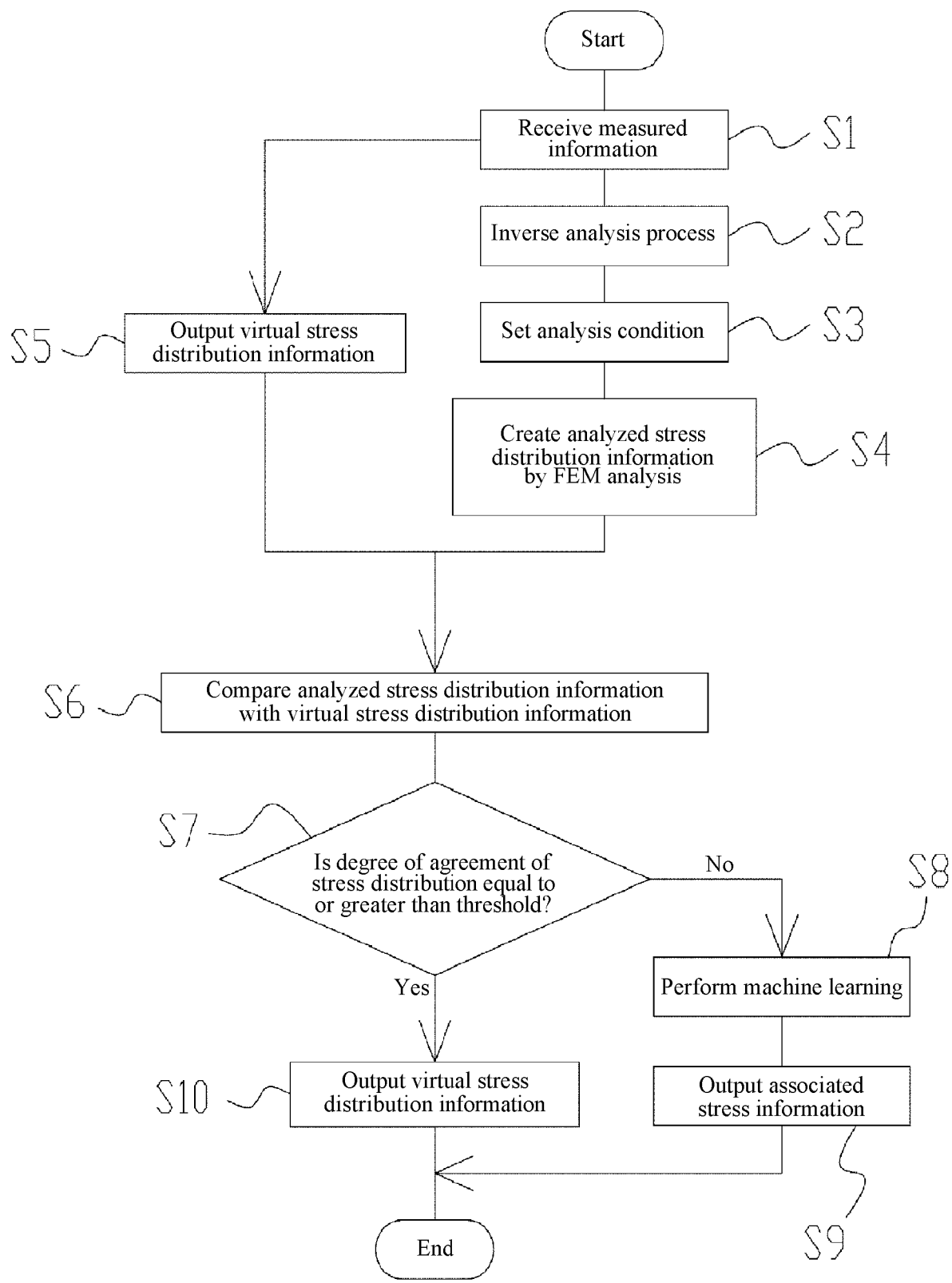
FIG. 5 is a flowchart illustrating an information transmission process in the stress monitoring system according to the example embodiment.
Figure 6:
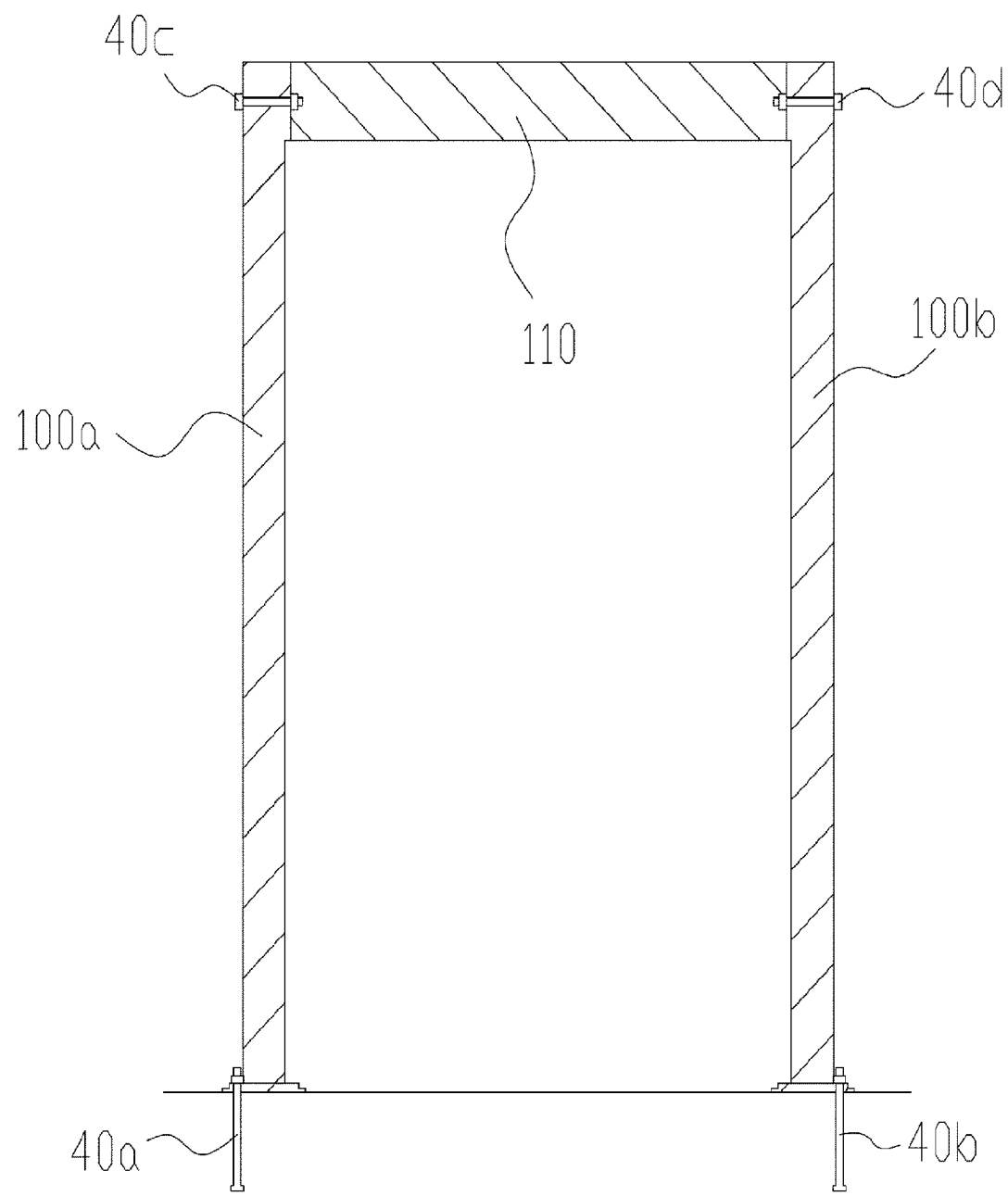
FIG. 6 is a diagram illustrating a structure.

Then, with reference to the flowchart shown in FIG. 5, an information transmission process by the stress monitoring system 1 according to the example embodiment is described. Here, the structure is a Rahmen structure (or rigid frame structure), which has two pillars 100a and 100b and a beam 110 shown in FIG. 6 as an example. Further, it is assumed that the control circuit 52 controls each unit to always operate.

The pillars 100a and 100b of the structure are buried in the ground and fixed to the ground, and pillar brackets (not shown) for vertically fixing the pillars 100a and 100b are fixed by two bolt-shaped sensors 40a and 40b in the form of anchor bolts. Further, the beam 110 is arranged between the pillars 100a and 100b, and is fixed to the pillars 100a and 100b by two bolt-shaped sensors 40c and 40d.

The bolt-shaped sensor 40a is arranged vertically in the axial direction and used for fixing the pillar 100a to the ground, the bolt-shaped sensor 40b is arranged vertically in the axial direction and used for fixing the pillar 100b to the ground, the bolt-shaped sensor 40c is used for fixing the pillar 100a and the beam 110 horizontally in the axial direction, and the bolt-shaped sensor 40d is used for fixing the pillar 100b and the beam 110 horizontally in the axial direction.

In addition, the stress monitoring device 2 performs constant monitoring, a predetermined load is applied to the structure, and the control circuit 52 of each of the bolt-shaped sensors 40a to 40d performs acquisition of the measured information by the measurement unit 54 and transmission of the sensor ID and the measured information by the RF unit 56 to the stress monitoring device 2.

The CPU 10 of the stress monitoring device 2 receives the sensor ID and the measured information from each bolt-shaped sensor 40a to 40d via the communication unit 22 (step S1). The CPU 10 refers to the design data storage 36 by the sensor ID and reads the design data. In other words, the design data including the bolt information of the same sensor ID as the received sensor ID is read from the design data storage 36. Further, the CPU 10 creates the associated stress information by associating the received measured information (stress information) with the design data.

FIG. 7 is a diagram illustrating a part of data constituting the associated stress information, and the associated stress information is configured by associating the sensor ID, the stress as the measured information, and the design data (disposed-position information, disposed-attitude information, structure ID, etc.) of each of the bolt-shaped sensors 40a to 40d. In addition, although not shown, other information (the structure information, the member information, etc.) included in the design data is also a part of information constituting the associated stress information. The associated stress information is stored in the memory 26.

As shown in FIG. 7, each stress based on the measured information has a stress value of 577 N/mm$^2$, which can be associated with the bolt-shaped sensor 40a of the sensor ID (001), the stress value of 194 N/mm$^2$, which can be associated with the bolt-shaped sensor 40b of the sensor ID (002), the stress value of 638 N/mm$^2$, which can be associated with the bolt-shaped sensor 40c of the sensor ID (003), and the stress value of 671 N/mm$^2$, which can be associated with the bolt-shaped sensor 40d of the sensor ID (004).

The CPU 10 performs an inverse analysis process by the analyzer 24 using the design data and the stress value of each of the bolt-shaped sensors 40a to 40d of the associated stress information (step S2). In this inverse analysis process, the load conditions acting on the structure (the magnitude of the load, the position and direction in which the load acts, etc.) are specified. In other words, when the stress value acts on each of the bolt-shaped sensors 40a to 40d in the structure determined by the design data, the load conditions of the load, which can act on the structure are specified by the inverse analysis. A method of the inverse analysis process is not particularly limited, and is appropriately set from a well-known inverse analysis method.

Figure 8:
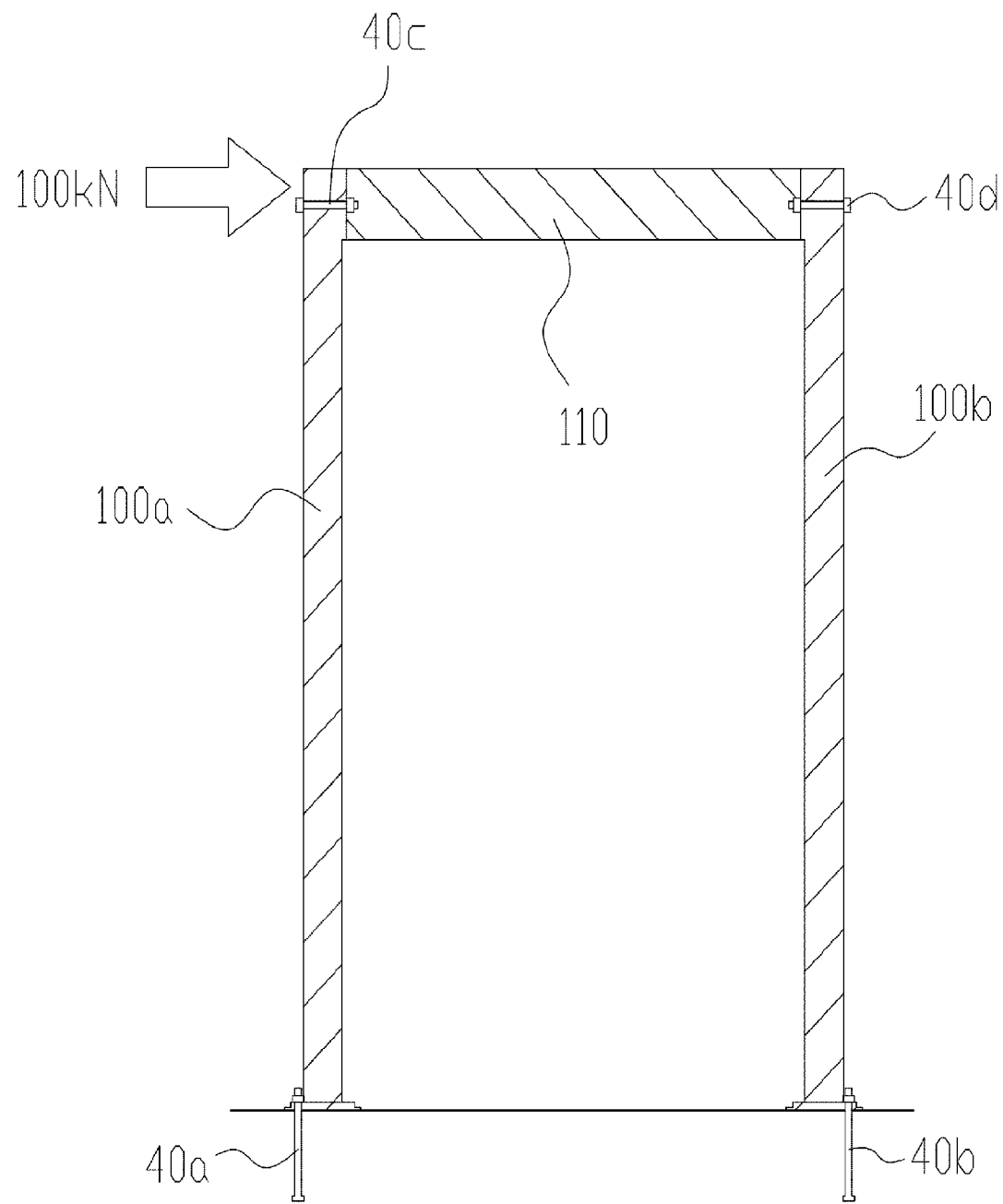
FIG. 8 is a diagram illustrating a load condition obtained by an inverse analysis.

The CPU 10 stores the load conditions specified by the inverse analysis by the analyzer 24 in the memory 26. As for the load conditions specified here, it is assumed that the position of the load is the upper end of the pillar 100a, the orientation of the load is substantially horizontal from the pillar 100a side toward the beam 110 side, and the magnitude of the load is 100 kN, as shown in FIG. 8.

Then, the CPU 10 sets analysis conditions in the FEM analysis as the forward analysis (step S3). Specifically, the load conditions and the design data (the member information, the structure information, the bolt information) are used as the analysis conditions. The CPU 10 executes the FEM analysis by the analyzer 24 to create the analyzed stress distribution information (step S4). The analyzer 24 inputs the load according to the load conditions to an FEM analysis model substantially equivalent to an actual structure, which can be reproduced by the design data, and outputs the analyzed stress distribution information as an analysis result of the stress distribution of the entire structure.

The CPU 10 can store the analyzed stress distribution information, the structure ID, the sensor ID, the measured information, the load conditions, and the like, in the memory 26 as the training data in association with each other. In addition, the training data is not limited to the above configuration and its configuration may be appropriately set. For example, the training data may consist of the analyzed stress distribution information, the structure ID, and the measured information, or may consist of the analyzed stress distribution information, the sensor ID, the measured information, and the load conditions.

Further, the CPU 10 inputs the stress values and the design data of the bolt-shaped sensors 40a to 40d to the neural network model, and creates the virtual stress distribution information applied to the entire structure from an output result (step S5). Specifically, the CPU 10 uses the design data read after step S1. The CPU 10 inputs the measured information and the design data to the neural network model stored in the learning memory 30, and obtains the output result.

The output result obtained at this time is a calculation result according to the neural network model, and the distribution information creator 32 creates the virtual stress distribution information from the output result. Further, the CPU 10 may perform the process of creating the virtual stress distribution information in step S5 in parallel with the process of creating the analyzed stress distribution information shown in steps S2 to S4.

Then, the CPU 10 compares the analyzed stress distribution information with the virtual stress distribution information (step S6), and determines whether or not a degree of agreement between the analyzed stress distribution information and the virtual stress distribution information is equal to or greater than a threshold (for example, 70%) (step S7). The degree of agreement of the stress distributions may be determined by comparing the stress distributions of the entire structure, but in order to reduce a processing load, a plurality of parts (members) in the structure may be designated and the stress distributions in each designated part may be compared. In addition, the parts to be compared may include portions that receive the load in the structure and are important for maintaining the shape of the structure, portions prone to change (destruction, deformation, or the like) due to the stress, and portions that are easily affected by the stress.

The CPU 10 executes the machine learning (step S8) if the degree of agreement of the stress distributions is less than the threshold (step S7, No). In other words, after giving the training data stored in the memory 26, the machine learning trainer 28 learns the weight parameters of the neural network model so that the stress distribution of the virtual stress distribution information matches the stress distribution of the analyzed stress distribution information.

The CPU 10 updates the weight parameter stored in the learning memory 30 according to the processing result by the machine learning trainer 28.

Figure 9:
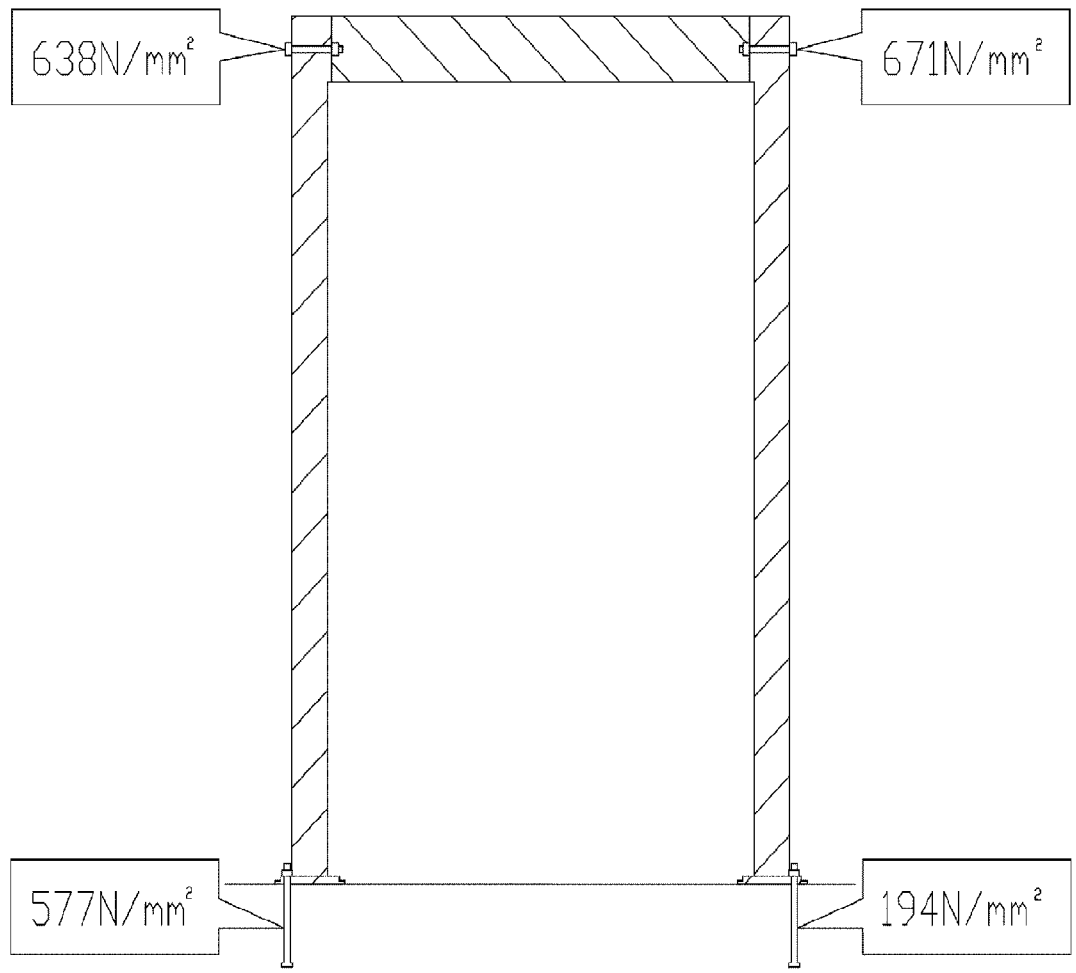
FIG. 9 is a diagram illustrating a measurement result image.

Further, the CPU 10 transmits the associated stress information to the user terminal 4 via the network 6 by the communication unit 22 (step S9), and ends the information transmission process. As shown in FIG. 9, the user terminal 4 receiving the associated stress information displays a measurement result image consisting of an overall view of the structure and the positions and attitudes of the bolt-shaped sensors 40a to 40d and the stress values as the result of measurement for each of the bolt-shaped sensors 40a to 40d shown in the overall view. Moreover, although the stress values are displayed on the measurement result image, the present disclosure is not limited thereto. The measured information such as the amount of deformation or strain may be displayed.

If the degree of agreement of the stress distributions is equal to or greater than the threshold (step S7, Yes), the CPU 10 sends the virtual stress distribution information as high likelihood distribution information to the user terminal 4 via the network 6 by the communication unit 22 (step S10), and ends the information transmission process. In addition, the CPU 10 updates the weight parameter according to the machine learning even when the degree of agreement of the stress distributions is equal to or greater than the threshold. Thereby, the degree of agreement of the stress distributions is further improved, and it is possible to create virtual stress distribution information with higher accuracy (maximum likelihood stress distribution information) among the high likelihood stress distribution information.

Figure 10:
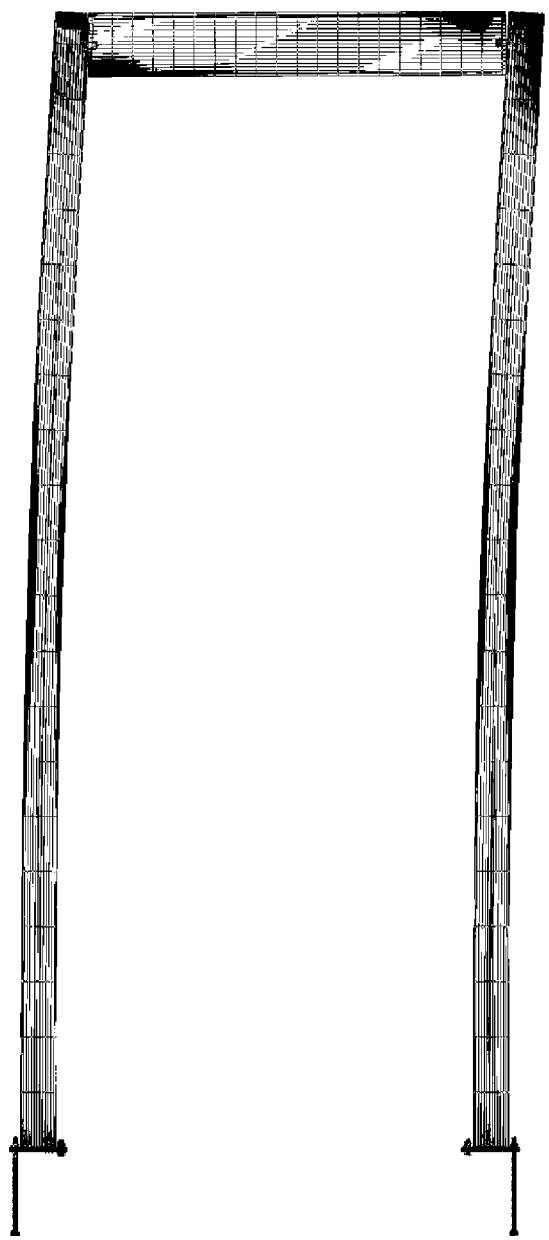
FIG. 10 is a diagram illustrating a stress distribution image.

The user terminal 4 receiving the high likelihood stress distribution information displays a stress distribution image created according to the high likelihood stress distribution information. As shown in FIG. 10, the stress distribution image shows the structure elastically deformed by the load and the stress distribution superimposed on the structure are shown. The stress distribution is shown by intermittent or continuous gradation using colors, shades of color, etc., for example, the lighter the color of the gradation, the lower the stress, and the darker the color, the greater the stress.

Therefore, as shown in FIG. 10, the color of the gradation may be displayed darker around the structure in which the pillars 100a and 100b are bent to the right, bent portions in the pillars 100a and 100b of the structure, and the bolt-shaped sensors 40c and 40d having the high stress values in the measured information (see FIG. 8), while the color of the gradation may be displayed lighter at portions of the pillars 100a and 100b near the ground, which are away from the position where the load of the load conditions is applied and away from the bent portions. Thus, it is possible to display a state of the stress distribution in an easy-to-understand manner visually and intuitively.

In addition, display contents of the stress distribution image are not limited to the above, and may be appropriately set, such as the positions of the bolt-shaped sensors 40a to 40d in the structure, the stress value by the measured information of each of the bolt-shaped sensors 40a to 40, or the position of the load, the orientation of the load, or the size of load based on the load conditions.

Therefore, the user can intuitively check the state of the structure to which the load is applied and the state of the stress distribution through the stress distribution image. Moreover, the user can check the state of the structure even in a place far from the structure to be monitored.

As described above, according to the stress monitoring system 1 according to the present disclosure, the stress distribution information is created according to the load conditions acquired by the inverse analysis and transmitted to the user terminal 4, and is displayed on the user terminal 4. Therefore, the user can check the stress distribution or the deformation of the construction (structure) from the stress distribution image even in a place far from the structure. Further, the user can figure out the state of the structure, where the stress is concentrated, or the like, from the stress distribution image, and can determine integrity of the structure, such as presence or absence of yield, a degree of fatigue, and an endurance limit. In addition, it is possible to specify a portion where abnormalities such as minute cracks may occur even at a position where the structure cannot be visually recognized.

Further, since the virtual stress distribution information transmitted to the user terminal 4 shows substantially the same stress distribution as the analyzed stress distribution information by the FEM analysis as the forward analysis, high likelihood stress distribution with high accuracy, more preferably, the maximum likelihood stress distribution information having the highest likelihood among the stress distribution information having high likelihood may be displayed to the user.

In addition, even if the stress distribution of the virtual stress distribution information is different from the stress distribution of the analyzed stress distribution information, the machine learning is performed to update the weight parameter of the neural network model, and the stress distribution of the virtual stress distribution information gradually approaches the stress distribution of the analyzed stress distribution information to match it to a higher degree. As a result, it is possible to improve the accuracy of the stress distribution based on the virtual stress distribution information.

When transmitting the virtual stress distribution information to the user terminal 4, for example, it is preferable to output the result calculated as the maximum likelihood stress distribution that is completely the same as the analyzed stress distribution information and has the most likelihood. Therefore, it is desirable that the machine learning be continuously executed until the virtual stress distribution information showing the maximum likelihood stress distribution is created.

Further, since the associated stress information can be transmitted even if the degree of agreement between the virtual stress distribution information and the analyzed stress distribution information is less than the threshold, the stress applied to the bolt-shaped sensor (junction member) is displayed on the user terminal. Thus, the user can figure out the state of the stress acting on each bolt-shaped sensor in the structure, and also determine the integrity, such as estimating the portion of the structure where the stress is concentrated.

In addition, the stress monitoring device automatically performs calculation of the load conditions including load information acting on the structure, automatic creation of the training data, update of the weight parameter of the neural network model, and output of the high or maximum likelihood stress distribution by the inverse analysis, the FEM analysis as the forward analysis, the process of creating the virtual stress distribution information, and an artificial intelligence algorithm based on other deep learning (machine learning). In other words, since the stress monitoring device incorporating the artificial intelligence program performs various processes by autonomous control, manual control by an administrator or the like becomes unnecessary. If the machine learning can be optimized based on results of performing machine learning on various structures, it is possible to significantly reduce the number of pieces of training data required to output a result of high likelihood stress distribution for each structure and time required for the machine learning.

Moreover, in the example embodiment described above, the analyzed stress distribution information is created every time the measured information is acquired in order to accumulate the training data. However, when the virtual stress distribution information corresponding to the above-described maximum likelihood stress distribution (the maximum likelihood stress distribution information) is created, the virtual stress distribution information may be transmitted to the user terminal without creating the analyzed stress distribution information for the structure. In other words, when the creation of the maximum likelihood stress distribution information is almost certain, accumulation of the training data is deemed sufficient, and the virtual stress distribution information may be transmitted to the user terminal without executing the processing by the analyzer 24 and the comparison processing between the analyzed stress distribution information and the virtual stress distribution information. By doing this, the processing load of the stress monitoring device 2 can be reduced.

In addition, when it is almost certain that the virtual stress distribution information created by the neural network model is the high likelihood stress distribution information, the comparison processing between the analyzed stress distribution information and the virtual stress distribution information for the structure may be omitted and the virtual stress distribution information may be transmitted to the user terminal as the high likelihood stress distribution information. This also makes it possible to reduce the processing load of the stress monitoring device 2. However, because of the accumulation of the training data, the creation processing of the analyzed stress distribution information, in other words, the training data and the machine learning processing by the machine learning trainer continue to be executed.

By omitting some processing such as the processing by the analyzer 24 and the comparison processing in this way, the processing time required from the acquisition of the measured information to the transmission of the virtual stress distribution information is greatly reduced, and as a result, the latest stress distribution image can be displayed on the user terminal immediately. Accordingly, when the load is applied to the structure, safety can be checked immediately, so that convenience is improved.

Further, in the above-described example embodiment, the RF unit 56 transmits the sensor ID and the measured information to the stress monitoring device 2 via the antenna, but the present disclosure is not limited thereto. The sensor ID and the measured information may be transmitted by communicatively connecting by wire the control circuit 52 and the stress monitoring device 2. In addition, a relay device may be connected to the stress monitoring device 2, and the relay device may relay the sensor ID and the stress value from the RF unit 56 and transmit them to the stress monitoring device 2.

Although the case where the male-threaded bolt-shaped sensor is used as the joining member for joining two or more members of the structure to each other has been described as an example, the shape of the joining member is not limited to the male-threaded type. The joining member may be in the form of any one of a female-threaded joining member, a washer-shaped joining member, a socket-shaped joining member, a tubular joining member, a plate-shaped joining member, an L-shaped joining member, and a T-shaped joining member, as long as it is used for joining two or more members.

Further, although the case where the stress is measured from the strain of the bolt-shaped sensor disposed on the structure has been described as an example, the present disclosure is not limited thereto. A strain measurement sensor may be formed in the structural member itself constituting the structure and directly measure the stress based on the strain of the member.

In addition, it is preferable that the structural member provided with the strain measurement sensor is disposed at a location where two or more structural members are joined to each other. Referring to FIGS. 9 and 10, it can be seen that the stress is concentrated in the bolt-shaped sensors 40c and 40d disposed between the beam 110 and the pillars 100a and 100b as members to be joined. This is because a large amount of stress may be exerted on the joining member, which fixes structural members engaging each other in the structure. Therefore, in stress monitoring of the structure, it is preferable to measure the stress of the structural member (joining member) for joining the structural members to each other.

Although the case where the load is simply applied has been described as an example in the above example embodiment, it is also possible to provide the measurement unit 54 with the temperature measuring means and perform temperature correction for the amount of strain or specify a thermal load from the temperature of the bolt-shaped sensor measured by the temperature measuring means. Therefore, it is possible to set an analysis condition in consideration of temperature rise and fall of the surroundings and the heat load due to a temperature difference between the inside and the outside of the structure.

In addition, the measurement unit 54 may measure vibration information of the structure caused by an earthquake by the acceleration measuring means or the gyro sensing means. In this way, it is possible to identify from which direction shaking is transmitted to the structure, and in the case that the entire structure is tilted due to land subsidence caused by the earthquake or the like, it is possible to reliably detected the tilt even if the tilt is slight.

In addition, in the above example embodiment, the case where the virtual stress distribution information or the associated stress information created by the stress monitoring device is simply transmitted to the user terminal has been described as an example, but the present disclosure is not limited thereto. For example, the stress monitoring device may output virtual stress distribution information or associated stress information when receiving a request from the user terminal.

Further, if the user terminal can receive the virtual stress distribution information or associated stress information output from the stress monitoring device, the stress monitoring device may create and store the virtual stress distribution information or the associated stress information, and the user terminal may access the stress monitoring device via the network to download (streaming may also be acceptable) the latest virtual stress distribution information or associated stress information of a predetermined structure.

In addition, the associated stress information or virtual stress distribution information (high likelihood stress distribution information, maximum likelihood stress distribution information) may be information for displaying the stress distribution image or the measurement result image on the user terminal, and the data format thereof is not particularly limited. In other words, the associated stress information and the virtual stress distribution information may be generated as image data.

In addition, information such as the associated stress information and the virtual stress distribution information output by the stress monitoring device may include any of still image information and moving image information as well as text data, table data, and graph information. Further, in order to facilitate understanding of changes in the stress distribution with time, it is preferable to use visual information, particularly moving image information. Creation of a moving image may be performed by a method set appropriately and, for example, the method may include creating a plurality of stress distribution images as still images (for example, the number of images equivalent to one minute as a moving image) and then displaying the plurality of stress distribution images on the user terminal.

Further, if the processing time from the acquisition of the measured information to the transmission of the virtual stress distribution information can be significantly shortened, it becomes easy to display the changes in the stress distribution acting on the structure in real time as a moving image. Specifically, the stress distribution image may be displayed on the user terminal by streaming distribution, and in this way, the stress distribution that may change with real time progress may be displayed on the user terminal.

In addition, the structure using the bolt-shaped sensor in the above-described example embodiment is not particularly limited, and may include various objects (a vehicle, a construction, etc.), devices (home appliances, etc.), and machines (an agricultural machine, a construction machine, a machine tool, etc.). For example, the vehicle or a moving object includes a manned or unmanned moving object, and includes a multiwheel vehicle and a wheelless vehicle to be used on land. The multiwheel vehicle with at least four wheels includes a truck, a bus, a fire truck, a ladder truck, a pump car, a trailer, a tank lorry, a mixer car, a crane car, a road sweeper, a vacuum car, a towing car, a truck with a snowplow, a train, a monorail, Shinkansen, a tram, a locomotive, a cable car, an armored car, and a tank. A four-wheeled vehicle includes a car, a patrol car, an ambulance, and a camper van. A three-wheeled vehicle includes a tricycle and a motorized tricycle. A two-wheeled vehicle includes a motorcycle, a scooter, a bicycle, an electric assist bicycle, a wheelchair, a stroller, and a rickshaw. A one-wheeled vehicle includes a one-wheeled car. The wheelless vehicle includes a linear motor car, a hovercraft, an elevator, an escalator, a lift, a gondola, a ropeway, a Ferris wheel, a merry-go-round, a swing, and a seesaw. Other vehicles with wheels include a wheel loader, a tire roller, a road roller, a grader, an asphalt finisher, a motor sweeper, a dump truck, a wheel crane, a forklift, a straddle carrier, a turret type interior carrier, an agricultural tractor, an agrochemical spraying car, a reaping and threshing car, a rice planting machine, a combine, an excavator, a backhoe, a loading shovel, a snowmobile, roller skaters, roller shoes, a skateboard, a kickboard, skis, a snowboards, and skate shoes. A flight vehicle or a moving object includes, irrespective of a manned flight or an unmanned flight, a light aircraft such as a balloon or an airship, and a heavy aircraft such as an airplane, a rotary wing airplane, a glider, a helicopter, a drone, a rocket or a vertical takeoff and landing machine. A marine vehicle includes a ship, a boat, a yacht, a ferry, a passenger ship, a cargo-passenger ship, a cargo ship, an oil tanker, a fishing boat, a warship, and a submarine. Further, components used for the vehicle include a monocoque, a body shell, a bonnet, a door, a tailgate, a front fender, a radiator grill, a bumper, a meter, a heater, a windshield glass, a door window glass, an engine, a radiator, a muffler, a brake pedal, an accelerator pedal, a clutch pedal, a seat, an exhaust pipe, a tail lamp, a headlamp, a wheel, a tire, a track, a propeller, a tank, a cylinder, a piston, an actuator, a damper, a linear guide, a bearing, a chassis, and a shaft.

The construction includes a structure and a civil engineering construction (workpiece). The structure includes housing, a commercial facility, a public facility, a cultural facility, an educational facility, a medical facility, an entertainment facility, a transportation facility, an industrial facility, a religious facility, a military facility, and a plant facility. The structure also includes a detached house, an attached house (terrace house), an apartment, a multi-unit dwelling, a share house, an office building, a church, a monastery, a temple, a shrine, a castle, a palace, an imperial palace, a garden, a park, a hospital, a clinic, a station, a station building, an airport, a public lodging house, a public office building, a police station, a fire station, a precinct station, a stadium, a ballpark, a schoolyard, a swimming pool, a school, a gymnasium, a theater, a cinema, a performance hall, an art center, a concert hall, a public hall, an meeting hall, a hotel, an inn, a factory, a storehouse, a warehouse, a boarding house, a dormitory, a child welfare facility, a midwifery office, a disabled person rehabilitation support facility, a mentally disabled person social rehabilitation facility, a protection facility, a women's protection facility, an intellectually handicapped person support facility, a senior citizen welfare facility, a nursing home, a special support nursing home, a day service center, a maternal and child health facility, a cinema, a museum, an art gallery, a library, a public restroom, a sport practice ground, a bowling alley, a sky resort, a department, a supermarket, a general store, an exhibition hall, a cabaret, a café, a nightclub, a bar, a dancing hall, a playground, a public bathhouse, a waiting room, a restaurant, a bistro, a shop, a garage, a car repair shop, a movie studio, and a television studio.

The civil engineering construction (workpiece) includes a bridge, a metal structure, a railroad, a road, a harbor, a coast, a river, a power generation facility or generating unit, a dam, a tunnel, a land improvement construction, a disaster prevention construction, and an agricultural civil engineering construction. The bridge includes a girder bridge, a cable-stayed bridge, a truss bridge, an arch bridge, a rigid frame bridge, and a suspension bridge. The metal structure includes a tower-like structure, a storage structure, a sluice/floodgate, a hydraulic iron pipe, a composite structure, a water supply facility, sewerage, and various types of pipelines including an object to be delivered such as gas or petroleum. The railroad includes a track, a track structure, a roadbed, a railroad station, a signaling/security/communication facility, a high-speed railway, a special railway, a cableway, and a city railroad. The road includes a roadbed, a pavement, an asphalt pavement, a concrete pavement, a gravel road, and a dustproof road. The harbor includes an anchorage, a breakwater, a revetment, a jetty, a wharf, a quay, a pier, a shed, a cargo handling/land facility, a ship and car communication facility, a fishing port, and a navigation aid. The coast includes a coastal structure. The river includes an embankment/revetment, a sand arrestation, a river structure, and a canal. The power generation facility or generating unit includes a water intake facility, a reservoir, a regulating reservoir, a nuclear power plant, a thermal power plant, a hydroelectric power plant, a tidal power generation, a geothermal power generation, a wave power generation, and a wind power generation. The dam includes a gravity dam, a fill-type dam, and an arch dam. The tunnel includes a tunnel structure. The land improvement construction includes a land formation, a reclamation, a dredging, an irrigation, a drainage, a reclamation, and mixing of soils.

Further, members used for the construction include stone including natural stone, artificial stone, and crushed stone, wood, a precut material, natural wood, machine grade wood, visual grade wood, ungraded wood, a class-A structural material, a class-B structural material, laminated wood, engineering wood, structural laminated wood, plywood, a wooden product, a resin product, a steel product, a steel material, a steel sheet, a steel frame, an organic material, a coating material, a waterproof material, a cement paste, slag, mortar, concrete, a tile, a porcelain tile, a stoneware tile, a pottery tile, a tatami mat, lightweight aerated concrete, a concrete panel, water resistant plywood, a gypsum board, a fireproof board, a calcium silicate board, a thermal insulation material, glass wool, rock wool, rigid urethane foam, Styrofoam, phenol foam, polystyrene foam, cellulose fiber, prestressed concrete, precast concrete, underwater concrete, polymer concrete, resin concrete, mass concrete, expanded concrete, low shrinkage concrete, and shrinkage-free concrete.

Parts of the construction include a structural material, a fastening member, a finishing material, a groundsill, an interior material, an exterior material, a facing material, a thermal insulation material, a base, a foundation, a wall, a pillar (column), a tubular column, a corner post, a splash post, a major pillar, a roof beam, a dragon beam, a round beam, an ascending beam, a roof, a ceiling, a floor, stairs, a puncheon, a vertical roof puncheon, a window, window glass, a window frame, a door, a door frame, a front door, a shelf, a baseboard, a door case, an upper frame of door case, a decorative pillar, an alcove, a decorated rail of alcove, a floor board of alcove, an alcove post, a transom, a lintel, an attached lintel, a girth, a dragon beam, a braced frame, a crosspiece, a stud, a puncheon, an eaves, an eaves soffit, a ceiling joist, an awning, a gutter, a flooring, a carpet, a cushion floor, cloth, wallpaper, a sliding door, door paper, a siding, an expansion joint, a roof tile, a cement roof tile, a slate roof tile, a colonial, a corrugated steel plate, and a handrail.

An architecture that implements each member of the construction includes masonry, a brick structure, a wooden structure, a wood structure, a soil structure, a steel structure (S structure), a light gauge steel (LGS) structure, a heavy steel structure, a plain concrete structure, a reinforced concrete (RC) structure, a steel frame reinforced concrete (SRC) structure, a concrete filled steel tube structure, a cement block (CB) structure, a reinforced CB structure, a steel concrete composite structure, a prestressed concrete (PC) structure, a membrane structure, a wall structure, a frame structure, a masonry structure, a pneumatic structure (single-layer film), a pneumatic structure (dual-layer film), a pneumatic structure (air beam), a pure rigid frame structure, a walled rigid frame, a streaked rigid frame, a brace structure, a core structure, a tube structure, a truss structure, a bolt structure, a shell structure, a cable (hanging) structure, a pin structure, a space frame, an arch, a dome shell, an earthquake resistant structure, a base isolation structure, a vibration damping structure, a rigid structure, a flexible structure, and an earthquake-proof structure.

The home appliances include video equipment (displaying device) such as a television or a projector, video equipment (recording/replaying device) such as a video tape recorder, a digital video disc (DVD) recorder, a Blu-ray disc recorder, a hard disk drive (HDD) recorder, a DVD player or a Blu-ray disc player, video equipment (capturing device) such as a video camera or a digital camera, acoustic equipment (recording/replaying device) such as a wire recorder, a tape recorder, a minidisc recorder, a radio cassette player or an IC recorder, acoustic equipment (replaying device) such as an analog player, a compact disk (CD) player, an amplifier or a radio, acoustic equipment (reproducing device) such as a speaker or a headphone, white goods (refrigerator and washing machine), and information appliances.

The agricultural machine includes a general purpose agricultural machine such as a tractor, an agricultural machine used for cultivation/soil preparation such as a plough, a harrow, a roller, a rotary cultivator, a puddling machine, a land roller, a leveler, a ridger or a slitting machine, an agricultural machine used for cultivation/formation/improvement such as a rooting machine, a pan breaker, a grooving machine, a mold rina (culvert drilling machine), a digger or a backhoe, a machine used for fertilization such as a manure spreader (compost fertilizer distributor), a slurry spreader, a lime sower (lime distributor), a planter (seeder) or a drill seeder with fertilizer, an agricultural machine used for sowing/transplanting such as a rice transplanter, a vegetable transplanter, a transplanter (transplanting machine) or a broadcaster, an agricultural machine used for control and management such as a sprayer a motor sprayer, a mist machine, a duster, a motor duster, a granule applicator, a motor granule applicator, a haze machine, an aerial sprayer/helicopter (air control), a soil sterilizer, a brush cutter, a farm master, a speed sprayer, a frost damage protection machine, a medium cultivating and weeding machine, a thinner (thinning machine), a motor pump or a sprinkler (irrigator), an agricultural machine used for harvest such as a binder, a combine, a vegetable reaping machine, a mower, a hay baler, a roll baler, a windrower, a thresher, a bean cutter (bean harvester), a corn harvester, a corn sheller, a potato harvester, a beet harvester, a sweet potato digging machine, a sweet potato vine cutter, a sugarcane harvester, a peanut harvester, a flax harvester, an onion digging machine, a chestnut thresher, a peanut thresher, a plucker, a mulberry shoot reaping machine, a special purpose crop digging machine, a vibrating harvester or a hop flower thinning machine, an agricultural machine used for drying and preparing crops such as a drying machine, a rice harvester (rice huller), a sorting machine, a rice milling machine, a grass dryer, a chicken droplet dryer, a special purpose crop dryer, a grain milling machine, a disc mower, a mower conditioner, a tedder, a rake, a forage harvester, a hay baler, a hay press, a road wagon, a hay loader, a bale loader, a feed cutter, a forage blower, a silage unloader, a feed grinder, a feed chopper, a root cutter, a feed compounder or a feed molding machine, an agricultural machine used for managing livestock such as an automatic feeder, a milker, a milk cooler, a waterer, a water heater, a slurry spreader, a barn cleaner, a sludge separator, an excretion processing device, a warmer, an egg lifter, a sorting machine for cleaned eggs or a barn sterilizer, an agricultural machine used for rearing silkworms such as a young silkworm co-rearing temperature control device, a power mulberry feeder, an automatic rearing machine for young silkworms, an automatic rearing machine for grown silkworms, a delimbing machine, a cocoon harvesting machine or a floss removing machine, an agricultural machine used for vegetable/fruit growing such as a mulcher, a crucific cultivating machine, a house heater, a vegetable washer, a deep placement fertilizer applicator, a motor trimmer, a tree tower, a rotary cutter for orchard, a fruit sorting machine, a container in arboricultural land or a power tiller, an agricultural machine used for tea production such as a tea steaming machine, a primary drying tea roller, a freshly-picked-tea-leaves rolling machine, a secondary drying tea roller or a final drying tea roller, an agricultural machine used for flowering/special purpose crop such as a pruning machine, a ramie peeler, a rush classifier, a tulip classifier or a peanut peeler, an agricultural machine used for forestry such as a bush cutter, a chain saw or a yader, and an agricultural machine used for transporting/conveyance such as a trailer, a grain conveyor or a front loader.

The general construction machine includes a bulldozer/scraper such as a bulldozer, a ripper bulldozer (bulldozer with rip saw), a scraper bulldozer, a towed scraper or a motor scraper, a backhoe/mucking shovel such as a hydraulic shovel (Yunbo), a backhoe, a power shovel, a dragline, a clamshell, an on-mud excavator, a tractor shovel, a wheel loader, a trencher or a bucket wheel excavator, a conveying machine such as a truck, a dump truck, a truck with a crane device, a trailer, a locomotive, a muck car, a shuttle car, a rough terrain hauler (special equipment hauler), a shovel loader, a fork loader, an all-wheel drive vehicle, a belt conveyor or a bucket wheel excavator, a crane/unloading machine such as a crawler crane, a truck crane, a wheel crane (all terrain crane), a rough terrain crane, a tower crane, a jib crane, a railroad crane, a floating crane, a pipe layer, a construction lift, an elevator, a portal crane, a fork lift, a straddle carrier, a container carrier, a top lifter, a clamp lift, an aerial vehicle (lift vehicle), a concrete floor finishing robot, a slinging excluding robot or an unloader, a foundation work machine such as a pile driver, a diesel hammer, a hydraulic hammer, a vibratory hammer, a water jet (water jet cutter), an earth auger, an inner excavator of earth auger, a drop hammer, a hydraulic steel pipe press-in and drawing machine, a sand pile driver, a powder injection agitator, an all casing backhoe, a hole digging and pole standing car, an earth drill, a reverse circulation drill, an underground continuous wall construction machine, a mud wastewater treatment facility (alkaline water neutralizer), a sludge suction and discharge vehicle (including vacuum car), a grout pump, a grout mixer (including mortar plant), pneumatic caisson construction equipment, a deep mixing processing machine, a ground improvement machine for high pressure injection stirring, chemical liquid injection and construction equipment, a caisson pile machine (rotary sprayer or underwater cutter) or a pile extractor, a perforator/tunnel construction machine such as a boring machine, a down-the-hole hammer, a rock borer (hand hammer, leg hammer, drifter, pick hammer, baby hammer, riveting hammer, chipping hammer, caulking hammer, scaling hammer, sand rammer, concrete breaker or large breaker), a drill jumbo, a crawler drill, a tunnel backhoe/cutter, a grab hopper, a grab lifter, tunnel construction equipment or shield construction equipment, a motor grader/sub-basics machine such as a motor grader, a stabilizer, a mixing plant or a mixing machine for super soft ground, compacting equipment such as a road roller (macadam roller or tandem roller), a tire roller, a tamping roller, a vibrating roller, a tamper, a rammer or a vibrating compactor, a concrete plant, a truck mixer (agitator body truck), a concrete pump car, a concrete pump, a concrete presser, a screw cleat, an agitator car or a concrete crusher, a paving machine such as an asphalt plant, a recycle plant, an asphalt finisher, an asphalt kettle, a distributor, a chip spreader, an asphalt cooker, a concrete spreader, a concrete finisher, a concrete leveler (concrete vertical finishing machine), a concrete simple finishing machine, a concrete lateral yarding machine, a vibrating joint cutting machine, a concrete cutter, an inner vibrator, an asphalt engine sprayer, an asphalt curbing machine, a joint sealer, a play susceptor, slip form paper or food preservation treatment machine, a pavement maintaining machine such as a road heater, a joint cleaner, a road cleaning car, a line maker, a dissolving tank, a lane marker removal machine, a road surface cutting machine, a road surface layer regenerating machine, a guardrail cleaning car, a road surface safety groove cutting machine (grooving machine), a sprinkler truck, a guardrail pole drive machine, a compartment line construction machine, a slab upper surface thickening machine, a micro surface machine or a drainage pavement function recovery machine, an air compressor/air blower such as an air compressor (pressure) or an air blower (fan), a pump such as a small spiral pump, a small multistage centrifugal pump (turbine pump), a underwater motor pump for deep well, a vacuum pump, an underwater motor pump for construction (diving pump), an underwater sand pump (underwater pump for construction with stirring device) or a slurry pump, an electric device such as a transformer, a switch in high pressure air, a cubicle type high-voltage substation facility or a motor generator, a winch such as a winch, a hoist or a chain block, test measurement equipment such as a track scale, a gauge, a core collector (core boring machine), a California bearing ratio (CBR) tester, a flat loading test apparatus, a grout flux/pressure measuring device, a gas detector, a noise meter, vibration measuring equipment, settling/inclination measuring equipment, a dust monitor, a nephelometer, an automatic surveying instrument or a light t wave measuring device, a temporary facilities apparatus for installing a steel bridge/PC bridge such as an erected girder, a bentgrass, a door type crane, a hoist, a chain block, a geared trolley, a winch, a jack, a hydraulic pump, a bogie for heavy weight, a delivery device, an steel tower, a carrier, a saddle, a back stay adjusting device, a cable anchoring device, a turn buckle, a rope hanger, an unreeler, a delivery device, a lateral yarding machine, a falling device, a traveler crane, a girder hanging device, a girder hanging gate preparation moving device, a turn table, a moving timber or a working car of ground cover and handrail, and other general land construction machines such as a concrete mixer, an aggregate measuring instrument, a concrete bucket, a concrete vibrator, a concrete crusher, a jaw crusher, an impact crusher, a welder, a welding rod dryer, a hydraulic jack, a drop hammer, a rail, a turn table, a mortar concrete spray machine, a concrete spray machine, an accelerating agent supply device, a seed spray machine, a Bentonite mixer, a water tank, a bush cutter, a lawn mower, a chain saw, a float, a construction signal, a construction high pressure washer, a chemical applicator, a hay collector, a jet heater, a garbage truck, a self-propelled crusher, a self-propelled soil improver or a self-propelled wood crusher.

Further, the present disclosure is also applicable to a special construction machine, and the special construction machine includes a harbor/river/coast construction machine such as a main working ship, an auxiliary working ship, an auxiliary facility for working ship or auxiliary equipment for harbor construction, a dam construction machine such as a concrete production facility, a concrete conveyance facility, a concrete cooling facility, an aggregate production facility, a cement conveyance/storage facility, a watering facility, a pollution prevention facility or other dam construction machines, a snow removal machine such as a snowmobile, a snow removal device, a snow removal attachment or a salt truck, a sewerage construction machine such as a propulsion construction machine, and a mine clearing machine.

The machine tool includes a lathe such as a general purpose or NC turret lathe, a milling machine using a milling cutter or an end mill, a shaping machine using a bite, a planing machine using a bite, a drilling machine using a drill, a reamer or a tap, a boring machine using a bite, an electric discharge machine such as a wire cut electric discharge machine or an engraving electric discharge machine, a broaching machine using a broach, a gear hobbing machine (hob), a gear cutting machine such as a gear shaper (rack cutter or pinion cutter), a grinder using whetstone, a contour machine, a band sawing machine, a machining center, a water jet processor, a laser processor, an electronic beam processor, a honing machine, an electrochemical machine, a deburring chamfering machine, an electrochemical deburring machining, a cutting machine, a forging machine, and a forming device such as a nut former or a part former. Further, the machine tool also includes various types of machining tools such as a drill, an end mill, a bite, a tip, a tap, toothed tools, a die and a mold, and a tool holder.

Other structures include structural materials for frames, structural materials for buildings, exterior materials, interior materials, wind power propellers, solar panels, cylinders, pistons, actuators, dampers, linear guides, bearings, engine blocks, chassis, shafts, rods, L-shaped metal fittings, curtains, roll curtains, handrails/lattices/sashes for verandas/balconies/windows, handrails for corridors, passages, stairs, bedside or toilet interior walls, chairs, desks, bookshelves, cupboards, beds, bathtubs, toilet seats, and toilet bowls.

In the above example embodiment, the case of monitoring the stress has been described as an example, but if a system includes an information acquisition unit configured to acquire measured information according to a target, an inverse analyzer configured to estimate a cause factor and its level by performing an inverse analysis on the measured information, a forward analyzer configured to perform a forward analysis using the cause factor and its level estimated by the inverse analyzer, and acquire a state according to the factor and its level of the target by the result of the forward analysis, a calculation unit configured to calculate a virtual state of the target by using the measured information, a trainer configured to generate a machine learning model for calculating the virtual state by the calculation unit and manage parameters of the machine learning model, and a determination unit configured to compare the state acquired by the forward analyzer and the virtual state and determine a degree of agreement, the trainer is configured to perform machine learning using the state of the target as training data so as to improve the degree of agreement by the determination unit, and update the parameters, it is not necessary to necessarily monitor the stress. For example, temperature distribution, heat conduction, or propagation state of vibration may be monitored.

In addition to the structures described above, the target to be monitored or analyzed may be a human body, facial expression, emotion, health condition, weather, topography (for example, faults), a celestial body, an image, or sound.

EXPLANATION OF REFERENCE NUMERALS

1 . . . Measurement System, 2 . . . Stress Monitoring Device, 4 . . . User terminal, 6 . . . Network, 20 . . . CPU, 22 . . . Communication Unit, 24 . . . Analyzer, 26 . . . Memory, 28 . . . Machine Learning Trainer, 30 . . . Learning Memory, 32 . . . Distribution Information Creator, 36 . . . Design Data Storage, 40 . . . Bolt-shaped Sensor, 42 . . . Head, 44 . . . Shaft, 44$a$ . . . Thread, 44$b$ . . . Column, 50 . . . Circuit Board, 52 . . . Control Circuit, 53 . . . Measurement Memory, 54 . . . Measurement Unit, 56 . . . RF Unit, 58 . . . Power Circuit, 60 . . . Strain Measurement Sensor.

The invention claimed is:

1. A stress monitoring device comprising:
an information acquisition unit configured to acquire measured information concerning deformation or strain applied to a member constituting a structure;
a memory configured to store associated stress information configured by associating the measured information with design information of the structure and disposition information;
a calculation unit configured to calculate stress distribution information on stress distribution acting on all or part of the structure from the associated stress information;
a trainer configured to generate a machine learning model for calculating the stress distribution information from the associated stress information by the calculation unit and manage parameters of the machine learning model;
an analyzer configured to analyze the associated stress information to acquire analyzed stress distribution information of the stress distribution of the structure; and
a determination unit configured to compare the stress distribution information by the machine learning model and the analyzed stress distribution information by the analyzer and determine a degree of agreement; and
wherein the trainer is configured to perform machine learning using the analyzed stress distribution information as training data so as to improve the degree of agreement by the determination unit and update the parameters.

2. The stress monitoring device of claim 1, wherein the information acquisition unit is configured to acquire the measured information by a strain sensor provided on the member.

3. The stress monitoring device of claim 2, wherein the strain sensor is integrally formed with the member.

4. The stress monitoring device of claim 2, wherein the strain sensor is disposed on the member disposed over and between two members to be joined fixed to each other.

5. The stress monitoring device of claim 2, wherein the strain sensor forms the member.

6. The stress monitoring device of claim 2,
wherein the member on which the strain sensor is provided is in the form of any one of a male-threaded joining member, a female-threaded joining member, a washer-shaped joining member, a socket-shaped joining member, a tubular joining member, a plate-shaped joining member, an L-shaped joining member, and a T-shaped joining member.

7. The stress monitoring device of claim 1,
wherein the analyzer is configured to perform an inverse analysis using the associated stress information to specify an analysis condition, perform a forward analysis by a finite element method using the analysis condition and the design information of the structure, and acquire the analyzed stress distribution information based on a result of the forward analysis.

8. The stress monitoring device of claim 7, wherein the analysis condition comprises a load condition.

9. The stress monitoring device of claim 1, wherein stress monitoring device is operable to output the stress distribution information in a case that the degree of agreement by the determination unit is equal to or greater than a threshold.

10. The stress monitoring device of claim 1, wherein the trainer generates a deep learning model.

11. The stress monitoring device of claim 1, wherein the structure is configured by joining two or more members.

12. A stress monitoring system comprising:
a stress monitoring device of claim 1; and
a strain sensor disposed on a joining member and connected to the stress monitoring device,
wherein the stress monitoring system is operable to output various types of information from the stress monitoring device to an external terminal.

* * * * *